United States Patent
Puigardeu et al.

(10) Patent No.: US 8,203,725 B2
(45) Date of Patent: Jun. 19, 2012

(54) AUTOMATIC ARRANGEMENT OF NESTED IMAGES AS A FUNCTION OF ASSIGNED PRINT MODES

(75) Inventors: Sergio Puigardeu, Barcelona (ES); Angel Martinez, Barcelona (ES); M. Isabel Borrell, Barcelona (ES)

(73) Assignee: Hewlett-Packard Development Company, L.P., Houston, TX (US)

( * ) Notice: Subject to any disclaimer, the term of this patent is extended or adjusted under 35 U.S.C. 154(b) by 885 days.

(21) Appl. No.: 12/244,804

(22) Filed: Oct. 3, 2008

(65) Prior Publication Data

US 2009/0303514 A1 Dec. 10, 2009

Related U.S. Application Data

(60) Provisional application No. 61/059,063, filed on Jun. 5, 2008.

(51) Int. Cl.
*G06K 15/00* (2006.01)
*G06F 3/12* (2006.01)

(52) U.S. Cl. ........................ 358/1.13; 358/1.14; 358/1.15

(58) Field of Classification Search ........................ None
See application file for complete search history.

(56) References Cited

U.S. PATENT DOCUMENTS

| | | | |
|---|---|---|---|
| 5,913,019 A | 6/1999 | Attenberg | |
| 6,147,742 A | 11/2000 | Bell et al. | |
| 6,623,528 B1 | 9/2003 | Squilla et al. | |
| 6,813,618 B1 | 11/2004 | Loui et al. | |
| 2001/0045966 A1* | 11/2001 | Inoue et al. | 347/3 |
| 2005/0005061 A1 | 1/2005 | Robins | |
| 2005/0111037 A1 | 5/2005 | Silvebrook et al. | |
| 2009/0021774 A1* | 1/2009 | Rai | 358/1.15 |

FOREIGN PATENT DOCUMENTS

WO WO2007045277 * 4/2007

* cited by examiner

*Primary Examiner* — Benny Q Tieu
*Assistant Examiner* — Haris Sabah

(57) ABSTRACT

Images selected for printing are assigned respective print-speed modes so that at least first and second of said images are assigned to a relatively fast print mode and at least a third image is assigned to a relatively slow print mode. The images are arranged as a function of print-speed mode so that said first and second images are in a first row and so that said third is in a second row. The images are then printed on real print media, with the first row being printed using a relatively fast print speed and the second row being printed at a relatively slow print speed.

20 Claims, 2 Drawing Sheets

AUTOMATIC ARRANGEMENT OF NESTED IMAGES AS A FUNCTION OF ASSIGNED PRINT MODES

CROSS-REFERENCE TO RELATED APPLICATION

This Utility Patent Application is based on and claims the benefit of U.S. Provisional Application No. 61/059,063, filed on Jun. 5, 2008 the contents of which are hereby incorporated by reference in their entirety.

BACKGROUND OF THE INVENTION

Photograph printing kiosks ("photo kiosks") are self-service stations, often installed in shopping malls, drugstores, and grocery stores, that allow a customer to obtain high-quality prints of their photographs. Modern photo kiosks include memory-card slots for reading media that many popular digital cameras used to store the images their users take. The kiosk prints images stored on the memory card.

Image nesting is a popular and cost-saving feature on many photo kiosks. Image nesting involves printing multiple images on a page, and is often used for making calendars and photo albums. While users are often given the option of arranging the photos themselves, it is important that they be able to achieve desirable results with minimal effort. To this end, many photo kiosks provide for automatically arranging the photographs, e.g., in chronological or some arbitrary order.

Users typically want their printouts as soon as possible without sacrificing print quality. However, all printers have limitations on print speed. In particular, the inkjet printers typically incorporated in photo kiosks print in transverse swaths across longitudinally advancing media. A printhead or a group of print heads (used to direct ink onto the media) may have to make several passes at each media advance position to ensure high print quality. All these passes consume time while a user waits for the image.

Many inkjet printers provide for plural print modes, including a slow print mode which can provide quality prints for all types of images and one or more faster print modes that can provide quality prints for at least some types of images. While it is generally undesirable to require a kiosk user to select print modes, it is possible for a kiosk to analyze an image and select a print mode automatically depending on the analysis outcome as taught in U.S. patent application Ser. No. 12/090, 819, filed Apr. 18, 2008 (which patent application claims priority to PCT application PCT/EP2005/055429, filed Oct. 20, 2005 and published as 2007045277 on Apr. 26, 2007). Using this automated print-mode selection allows a user to receive a high-quality print using the fastest print mode that can yield a high quality print of the given image.

This reference does not address nested images explicitly; however, it can be inferred that in the case of nested images, the print mode for a page would be selected to match the slowest print mode associated with any of the nested images. Thus, for a page with nine images, if any of the nine require the slowest print mode, all nine images would be printed using the slowest print mode. What is needed is a way to reduce the time required to generate high-quality prints of nested images.

Herein, related art is described to facilitate understanding of the invention. Related art labeled "prior art" is admitted prior art; related art not labeled "prior art" is not admitted prior art. Of course, the prior art status of references can often be determined from their publication, filing, and issuance dates, notwithstanding any lack of explicit admission.

BRIEF DESCRIPTION OF THE DRAWINGS

The figures depict implementations/embodiments of the invention and not the invention itself.

DETAILED DESCRIPTION

The present invention provides for automatically arranging nested images in separate transverse rows and/or separate pages according to their required print modes. In an inkjet printer, print mode can be set on a per-row and basis. Therefore, high print speeds can be achieved for any row not including a "complex" image. Arranging nested images to minimize the number of rows with complex images and adjusting print speeds accordingly per row of images provides enhanced page print speeds.

Figure 1:
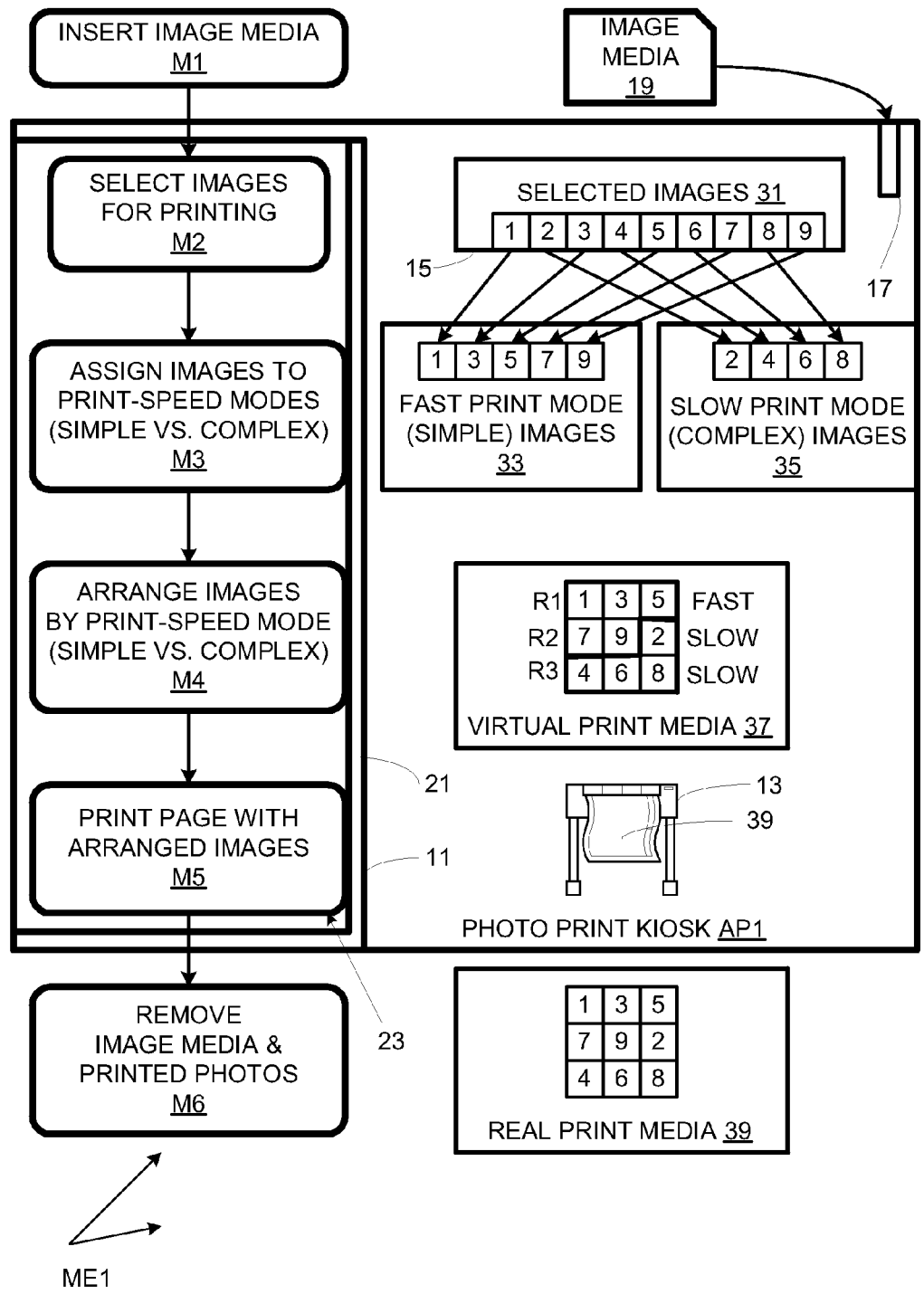
FIG. 1 is a schematic depiction of a photo kiosk and a method of its operation in accordance with embodiments of the invention.

A photo kiosk AP1 includes a computer 11, a printer mechanism 13, a touchscreen display 15, and a memory-card slot 17 [need to add number in FIG. 1], as shown in FIG. 1. Alternative embodiments provide for non-touchscreen control panels. Also, alternative embodiments provide other means for inputting images, including a CD-ROM drive, a photo scanner, a negative scanner, a slide scanner, an internet connection, a USB port, etc. Memory card slot 17 can be for a "secure digital" SD card 19, e.g., one used to store images as they are acquired by a digital camera; alternatively, multiple memory card slots can be provided to accommodate multiple form factors such as MemoryStick, xD cards, miniSD, microSD (TransFlash), compact flash, etc.

Kiosk AP1 provides for a method ME1 including method segment M1-M6, as shown in FIG. 1. Computer 11 includes computer-readable media 21 encoded with a program 23 of computer-executable instructions that collectively implement method segments M2-M5. Method segments M1 and M6 are user implemented, while method segment M2 is interactively implemented with a user interfacing with touch screen 15.

At method segment M1, a user inserts memory card 19 into memory card slot 17. In response, kiosk AP1 can display images represented on memory card 19 on display 15. At memory segment M2, the user can interact with touchscreen display 15 to select a set 31 of images to be printed on a page or pages. As shown in FIG. 1, a user has selected images 1-9 for nested printing.

At method segment M3, computer 11 (by executing program 11) analyzes the selected images and classifies them accordingly by print-speed mode. For example, images can be automatically analyzed using an algorithm disclosed in U.S. patent application Ser. No. 12/090,819, filed Apr. 18, 2008 (cited in the background section hereof).

As applied in the present context, this method involves determining lightness statistics (e.g., mean and standard deviation values) for each of the images to be printed. To this end, each image is divided into small square sectors. The size of the sectors to be analyzed is the minimum area in which banding can be perceived. In each one of the square sectors a lightness histogram is obtained and analyzed to obtain mean and standard deviation values for lightness on a per-sector basis. In general, banding artifacts are more visible when the standard deviation is lower (e.g., as it is for gentle gradients)

and when the mean value is higher (as it is for lightly inked areas). Based on certain thresholds, the fastest print-mode for which banding is not likely to be perceived is determined. The slowest such print mode across the sectors of an image is assigned to the image as a whole.

The invention provides for other methods for analyzing and classifying images. For example, the initial resolution of an image can be used instead of or in combination with lightness values in assigning the image to a print mode and thus its location in an arrangement of nested images.

For example, if it is decided whether banding is prone to be seen in each squared area if a relatively high-speed print mode (e.g., 4-6 passes, sufficient for color quality and grain) is used. If any of the sectors is found to be prone to banding at a high-speed print mode, a lower speed print mode (e.g., 8-12 passes, sufficient for banding-free printing) is selected for that image.

As a shorthand herein, images that can be printed without unacceptable printing artifacts such as banding using a high-print-speed mode are referred to as "simple", while images requiring a low-print-speed mode for artifact-free printing are referred to as "complex". However, it should be recognized that complexity for printing purposes does not correspond to image detail, as highly detailed images are more likely to mask print artifacts than [are?] simpler images with smooth gradients. In the illustrated embodiment, the odd-numbered images are "simple" and the even numbered images are "complex". Thus, images 1, 3, 5, 7, and 9 are in the "simple" or "fast-print mode" category 33, while images 2, 4, 6, and 8 are classified into the "complex" or "slow-print mode" category 35.

At method segment M4, the classified images are arranged on a virtual print media 37 (e.g., one or more virtual pages) so that at least one row includes only images classified as requiring a relatively fast print mode. Where there are only two print-speed modes, the goal is to have as many rows as possible consist of only simple images. In the illustrated case, nine images are to be arranged in a 3×3 array. Since there are four complex images (2, 4, 6, 8), at least two rows must have at least one complex image. This leaves only one row with only simple images. In the illustrated case, row R1 has only simple images (1, 3, 5), while row R2 has two simple images (7, 9) and one complex image (2). Row R3 has three complex images (4, 6, 8). Accordingly, Row R1 will be printed at high speed and rows R2 and R3 will be printed at the slow speed. The invention is not limited to assigning images within a page: if there are more images than can fit on a page, the invention can arrange images so that simple images are assigned to one page and complex images are assigned to another page.

In some cases, it is not necessary to analyze and assign all selected images to print-speed modes. For example, if the images are to be arranged in a 3×3 array, once three simple images are found and four complex images are found, the complexity of the remaining images does not impact throughput. In FIG. 1, the print speed would not be changed if images 7 and 9 were complex instead of simple. The analysis and assignment of images only needs to progress to the point where an optimal arrangement can be determined.

At method segment M5, real print media 39 is printed with the images arranged as determined in method segment M4. Printer mechanism 13 advances media 37 in longitudinal steps and applies ink in transverse swaths. In high-speed print mode, six passes are required per media advance position while in high-quality print mode, twelve such passes are required. Thus, the print speed in high-speed mode is about double that in high quality mode. Row R1 is printed in high-speed mode, while rows R2 and R3 are printed in high-quality print mode; the end result is that page print speed is increased by about 16% relative to printing the whole page at a slow speed. Note that if there were one more simple image and one fewer complex images, the print speed would be increased 33% relative to a full page in high quality print mode. Once printing is complete, the printed media can be removed by the user at method segment M6. Memory card 19 can also be removed at this point.

In the example above, images are classified into two print-mode classes. However, images can be classified into more classes or even ranked. Optimally, images of equal or nearly equal complexity would be arranged in rows together. A simple algorithm fills the first row with the simplest images, the second row with the next simplest images, and so on, with the most complex images being reserved for the last row. However, this algorithm can be reversed, e.g., the most complex images can be assigned first. Also, the inter-row order does not affect print speed significantly, so, for example, a middle row can include the simplest images.

Herein, the terms "simple" and "complex" as applied to images relate to the difficulty of printing those images without significant visible artifacts. For example, in the illustrated embodiment, rows of simple images are printed in a high-speed print mode using six passes per media advance position to print; rows containing a complex image are printed in a slow-speed high-quality mode using twelve passes per media advance position. A "simple" image is an image that can be printed in a relatively high-speed print mode without suffering excessive visible printing artifacts. A very detailed image can be "simple" in this respect, as image details often obscure printing artifacts. A "complex" image is one for which a high-quality print mode is required to avoid visible print artifacts. A relatively undetailed image with large expanses of subtle shadings may require a slow-speed printing mode to avoid visible artifacts.

Figure 2:
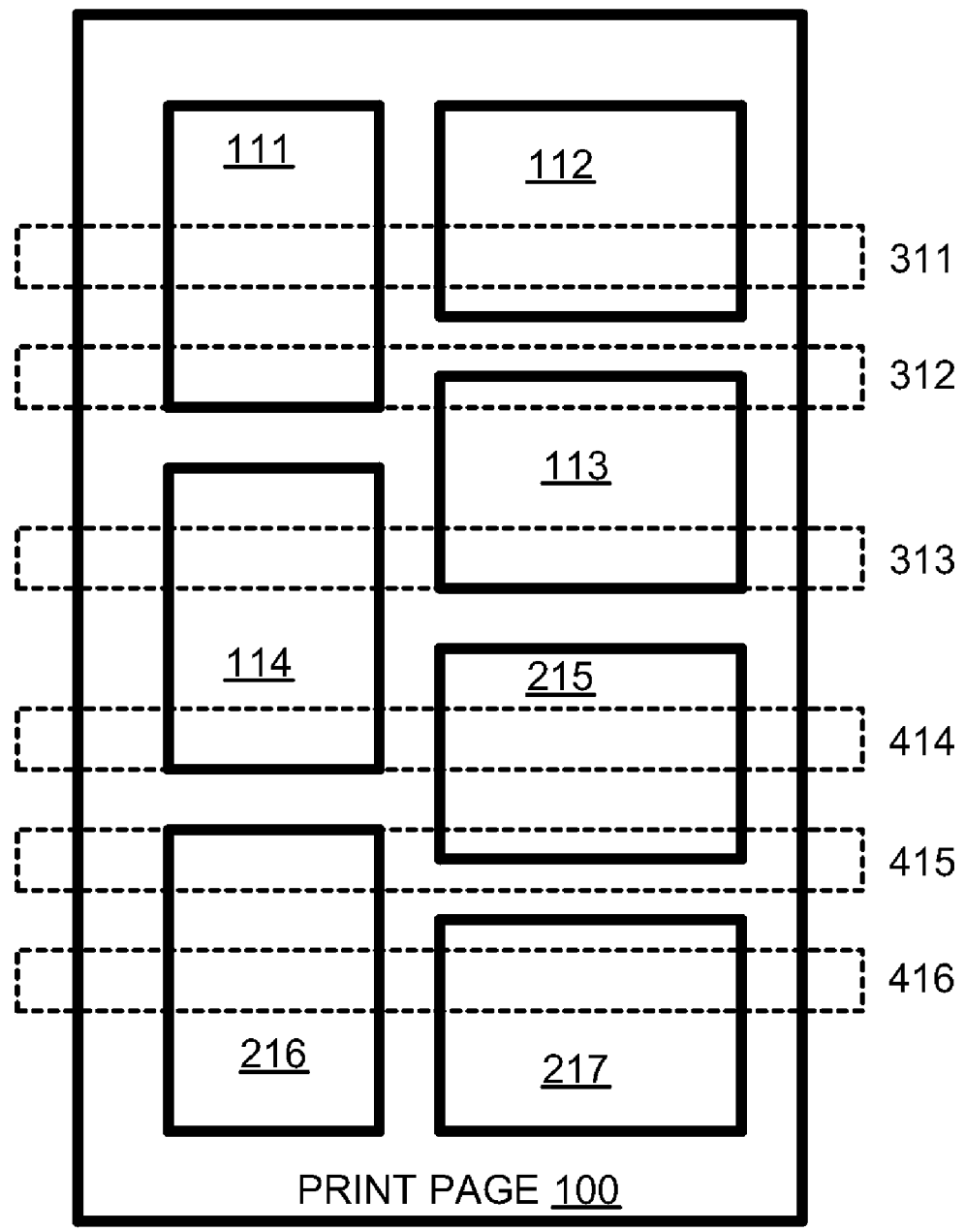
FIG. 2 represents print media with nested images printed thereon in accordance with an embodiment of the invention.

Herein, two images are in the "same row" if they have longitudinally overlapping media advance ranges so that at least one swath intersects both images. For example, consider the arrangement of FIG. 2 in which images 111-114 and 215-217 are arranged on a print page 100. Images 111, 114, and 216 are in portrait orientation, while images 112, 113, 215, and 217 are in landscape orientation. Images 111 and 112 are in the same row as swath 311 extends through both images. Images 111 and 113 are in the same row as swath 312 extends through both these images. However, images 112 and 113 are not in the same row, since no swath extends through both these images.

Images 111-114 are simple images, while images 215-217 are complex images. Accordingly, swaths 311-313 are printed in six-pass high-speed print mode as both these swaths extend only through simple images. Swaths 414-416 are printed in twelve-pass high-quality print mode as each passes through rows having at least one complex image. Note that this implies the print mode changes during the printing of image 114. This embodiment provides that the print mode can change in the midst of an image without introducing unacceptable artifacts. Otherwise, the images must be arranged to avoid overlap of different complexity images]

The print media can be roll or sheet media. Sheet media can have dimensions such as 8"×10", 11−×17". Also, standard paper sizes including letter size and A4 size can be used. Roll media of various lengths and widths can be used to permit variable length printing. In addition to using photographic paper, alternative media such as fabric and labels can be used.

While the illustrated embodiment involves a kiosk, the invention also provides for other contexts. For example, the invention provides for a software-based photo-printing product that auto-arranges nested images based on the print-modes available on a target printer. In addition, the invention can be built into a digital camera as firmware, allowing a camera to arrange its photographs for optimal printing. These and other variations upon and modifications to the illustrated embodiment are provided by the present invention, the scope of which is defined by the following claims.

What is claimed is:

1. A method comprising:
   selecting a set of images to be printed;
   assigning a respective print-speed mode to each of at least some of said images so that at least first and second of said images are assigned to a relatively fast print mode and at least a third image is assigned to a relatively slow print mode;
   arranging said images as a function of print-speed mode so that said first and second images are in a first row and so that said third image is in a second row not including said first and second images; and
   printing said images on a roll or sheet of print media so that said first row is printed at a relatively high print speed and said second row is printed at a relatively low print speed.

2. A method as recited in claim 1 wherein said printer is an inkjet printer that prints in transversely extending swaths on longitudinally advancing media, said rows extending transversely so that a first swatch contributes ink to said first and second images but not to said third image.

3. A method as recited in claim 1 wherein said assigning involves analyzing at least some of said images to determine their complexity.

4. A method as recited in claim 3 wherein said analysis involves generating lightness histograms for said images.

5. A method as recited in claim 3 wherein said analysis involves determining an initial resolution of an image.

6. A method as recited in claim 1 wherein said complexity is a function of the number of printhead passes per swath required to achieve a printed image free of visible print artifacts.

7. A method as recited in claim 1 wherein said print artifacts include banding.

8. A method as recited in claim 1 wherein said selecting, assigning, arranging, and printing are performed by a photo kiosk.

9. A method as recited in claim 1 wherein said first image is printed using only said relatively fast print mode and said third image is printed using only said relatively slow print mode.

10. A method as recited in claim 9 wherein said second image is printed using both said relatively fast print mode and said relatively slow print mode.

11. A system comprising:
    means for selecting plural images for printing,
    means for assigning print-speed modes to said images, said print-speed modes including one or more relatively fast print modes and one or more relatively slow print mode, and
    means for arranging said images as a function of print-speed modes so that said first and second images are in a first row and so that said third image is in a second row not including said first and second images,
    means for printing said images on a roll or sheet of print media so that said first row is printed at a relatively high print speed and said second row is printed at a relatively low print speed.

12. A system as recited in claim 11 further comprising a print mechanism for printing said images as arranged by said means for arranging on real print media, said print mechanism printing said first row using a relatively fast print mode and said second row using a relatively slow print mode.

13. A system as recited in claim 12 wherein said arranging means is for arranging said images so there is a third row between said first and second rows, said print mechanism printing an image in said third row in part using a relatively fast print mode and in part using a relatively slow-print mode.

14. A system as recited in claim 11 wherein said means for assigning analyzes said images to determine their respective complexities and assigns said print-speed modes as a function of the determined complexities.

15. A system as recited in claim 11 wherein said system is a photo kiosk.

16. A system as recited in claim 11 wherein said means for assigning includes means for determining lightness distribution statistics for said images.

17. A system as recited in claim 11 wherein said means for assigning includes means for determining initial resolutions for said images.

18. An image arrangement product comprising computer-readable media encoded with a program of computer-executable instructions, said program providing for:
    selecting a set of images to be printed,
    assigning a respective print-speed modes to each of at least some of said images so that at least first and second of said images are assigned to a relatively fast print modes and at least a third image is assigned to a relatively slow print mode, and
    arranging said images as a function of print-speed modes so that said first and second images are in a first row and so that said third is in second row not including said first and second images, and
    printing said images on a roll or sheet of print media so that said first row is printed at a relatively high print speed and said second row is printed at a relatively low print speed.

19. An image arrangement product as recited in claim 18 wherein said program provides for determining statistics on lightness distributions in said images.

20. An image arrangement product as recited in claim 18 wherein at least one of said images is printed in part using a relatively fast print mode and in part using a relatively slow print mode.

* * * * *

UNITED STATES PATENT AND TRADEMARK OFFICE
CERTIFICATE OF CORRECTION

| | | |
|---|---|---|
| PATENT NO. | : 8,203,725 B2 | Page 1 of 1 |
| APPLICATION NO. | : 12/244804 | |
| DATED | : June 19, 2012 | |
| INVENTOR(S) | : Sergio Puigardeu et al. | |

It is certified that error appears in the above-identified patent and that said Letters Patent is hereby corrected as shown below:

In column 5, line 31, in Claim 2, delete "swatch" and insert -- swath --, therefor.

In column 6, line 44, in Claim 18, delete "third is in second" and insert -- third image is in a second --, therefor.

Signed and Sealed this
Eighteenth Day of December, 2012

David J. Kappos
*Director of the United States Patent and Trademark Office*